United States Patent
Osawa et al.

(10) Patent No.: US 8,794,103 B2
(45) Date of Patent: Aug. 5, 2014

(54) ACCELERATOR PEDAL APPARATUS

(75) Inventors: Tsuyoshi Osawa, Kanagawa (JP);
Masato Kumamoto, Kanagawa (JP);
Yoshitomo Fukushima, Kanagawa (JP);
Kouji Kikuchi, Kanagawa (JP);
Tsuyoshi Shimizu, Kanagawa (JP);
Hisashi Kawade, Kanagawa (JP);
Hiromutsu Touhachi, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 607 days.

(21) Appl. No.: 12/923,441

(22) Filed: Sep. 21, 2010

(65) Prior Publication Data

US 2011/0083527 A1 Apr. 14, 2011

(30) Foreign Application Priority Data

Sep. 24, 2009 (JP) ................. 2009-218656

(51) Int. Cl.
*G05G 1/44* (2008.04)
*B60K 26/02* (2006.01)
*G05G 1/38* (2008.04)
*G05G 5/03* (2008.04)

(52) U.S. Cl.
CPC ............. *B60K 26/021* (2013.01); *G05G 1/38* (2013.01); *G05G 1/44* (2013.01); *G05G 5/03* (2013.01)
USPC .................................. 74/513; 74/512; 74/560

(58) Field of Classification Search
CPC ........... B62K 26/021; G05G 1/38; G05G 1/44
USPC .................................. 74/512–514, 560, 470
IPC .......................... B60K 23/02, 26/02; B60T 7/06
See application file for complete search history.

(56) References Cited

U.S. PATENT DOCUMENTS 6,147,590 A * 11/2000 Mikolcic .................... 338/153
6,164,155 A * 12/2000 Tonissen et al. ............. 74/514

(Continued)

FOREIGN PATENT DOCUMENTS

DE   10 2004 025 829 A1    12/2005
DE   10 2010 031 371 A1 *   1/2012 ............ G05G 1/44
JP           5-185912    *   7/1993 ............ B60T 7/06

(Continued)

OTHER PUBLICATIONS

EPO Machine translation of DE10 2004 025 829 A1, Leone, Dec. 2005.*
English Abstract of DE 10 2010 031 371 A1, Tsoviakis et al., Jan. 2012.*

*Primary Examiner* — Vinh Luong
(74) *Attorney, Agent, or Firm* — Staas & Halsey LLP

(57) ABSTRACT

An accelerator pedal apparatus includes a pedal arm rotating around a first rotation axis line and having a contact portion, a return spring and a reaction force adding mechanism including a drive source and a rotation member rotating around a second rotation axis line in a state of being contacted to the contact portion which adds reaction force to return the pedal arm toward the rest position. A first distance from the contact position of the rotation member with the contact portion to the first rotation axis line is longer than a second distance to the second rotation axis line. The rotation member includes a contact section having the contact portion displaced while being contacted so that the contact portion is to be closer to the second rotation axis line when rotating toward the maximum depression position and to be farther from the second rotation axis line when rotating toward the rest position.

11 Claims, 5 Drawing Sheets

(56) References Cited

U.S. PATENT DOCUMENTS

| | | | |
|---|---|---|---|
| 7,044,019 B2 * | 5/2006 | Hauschopp et al. | 74/512 |
| 2006/0283282 A1 * | 12/2006 | Fujiwara | 74/512 |
| 2007/0245844 A1 * | 10/2007 | Yokoyama et al. | 74/470 |
| 2010/0083789 A1 * | 4/2010 | Osawa et al. | 74/513 |
| 2011/0041647 A1 * | 2/2011 | Soltys | 74/560 |
| 2012/0221220 A1 * | 8/2012 | Yamazaki et al. | 701/70 |

FOREIGN PATENT DOCUMENTS

| | | | | |
|---|---|---|---|---|
| JP | 2001-253327 | * | 9/2001 | B60T 7/06 |
| JP | 2004-86567 | * | 3/2004 | B60T 7/06 |
| JP | 2007-528177 | | 9/2007 | |

* cited by examiner

US 8,794,103 B2

ACCELERATOR PEDAL APPARATUS

CROSS-REFERENCE TO RELATED APPLICATIONS

This application claims the priority benefit of Japanese Patent Application No. 2009-218656, filed on Sep. 24, 2009 in the Japanese Patent Office, the disclosure of which is incorporated herein by reference.

BACKGROUND

1. Field

Embodiments relate to an accelerator pedal apparatus applied to vehicles and the like having a drive-by-wire system, and in particular, an embodiment relates to an accelerator pedal apparatus capable of performing active control to generate reaction force (i.e., resistance force or press-back force) against tread force of a pedal arm for danger avoidance, danger notification, fuel consumption improvement, and the like.

2. Description of the Related Art

An accelerator pedal apparatus adopted to an electronically controlled throttle system (i.e., a drive-by-wire system) for an engine mounted on an automobile and the like includes a pedal arm (i.e., a pedal element) being rotatably supported to a housing (i.e., a pedal holding member) between a rest position and a maximum depression position while integrally having an accelerator pedal, an active control mechanism to control the accelerator pedal so as to be pressed-back against depression operation of a driver as being contacted to an upper end portion of the pedal arm, and the like. The active control mechanism disclosed in Japanese Patent Publication 2007-526177 includes a movable operation member (i.e., an operation push rod, a bowl-shaped yoke, and a ring-shaped magnet) linearly reciprocating in the approximate horizontal direction, a bowl-shaped coil bearing member fixed to the housing to exert electromagnetic drive force to the movable operation member, a coil wound around the coil bearing member, a spring urging the movable operation member so that the movable operation member (i.e., the operation push-rod thereof) is continuously contacted to the top end portion of the pedal arm, and the like.

Here, the active control mechanism adopts a solenoid type electromagnetic drive system as a drive source. Accordingly, the movable operation member contacted to the top end portion of the pedal arm is shaped elongated to reciprocate linearly in the approximate horizontal direction, so that the apparatus is upsized in the horizontal direction. Further, it is configured that the movable operation member transmits the electromagnetic drive force due to the solenoid type directly to the top end portion of the pedal arm. Therefore, variation in the electromagnetic drive force is directly transmitted to the pedal arm to cause a fear that stable active control operation cannot be performed. Further, the spring included in the active control mechanism is utilized for a return spring to return the pedal arm toward the rest position. Therefore, when the movable operation member is fixed to be non-movable in a state that the spring is compressed, there is a fear that the pedal arm cannot be returned completely to the rest position.

Further, another accelerator pedal apparatus includes a pedal arm (i.e., a pedal element) being rotatably supported to a housing between a rest position and a maximum depression position while integrally having an accelerator pedal, an active control mechanism to control the accelerator pedal so as to press back against depression operation of a driver as being contacted to an upper end portion of the pedal arm, and then, the active control mechanism includes a plunger element linearly reciprocating in the approximate horizontal direction, a torque motor exerting reciprocating drive force to the plunger element, a coil spring urging the plunger element to be continuously contacted to the top end portion of the pedal arm, and the like. An example above-noted accelerator pedal apparatus is disclosed in German Patent Publication DE 10-2004-025829A1.

Here, in the active control mechanism, the plunger element contacted to the top end portion of the pedal arm is shaped elongated to reciprocate linearly in the approximate horizontal direction, so that the apparatus is upsized in the horizontal direction. Further, it is configured that a rotation type torque motor is adopted as a drive source of the plunger element and the rotational drive force of the torque motor is converted into linear drive force of the plunger element via a pin to set arm length of the rotation torque to be approximately constant. Therefore, variation in the drive force (i.e., the torque) within the operational range of the torque motor is directly transmitted to the pedal arm via the plunger element to cause a fear that stable active control operation cannot be performed.

Further, similar to the abovementioned technology in the related art, the spring included in the active control mechanism is utilized for a return spring to return the pedal arm toward the rest position. Therefore, when the plunger element is fixed to be non-movable in a state that the spring is compressed, there is a fear that the pedal arm cannot be returned completely to the rest position.

SUMMARY

Therefore, it is one aspect to provide an accelerator pedal apparatus capable of performing active control with quick response while achieving structural simplification, parts count reduction, cost reduction, entire apparatus miniaturization, and the like.

Additional aspects will be set forth in part in the description which follows and, in part, will be apparent from the description, or may be learned by practice of the invention.

In accordance with one aspect, an accelerator pedal apparatus includes a pedal arm being interlocked with an accelerator pedal and having a contact portion, a housing to support the pedal arm between a rest position and a maximum depression position as being rotatable around a first rotation axis line, a return spring to return the pedal arm toward the rest position, and a reaction force adding mechanism which includes a drive source arranged at the housing and a rotation member being rotated around a second rotation axis line in the same direction as the pedal arm in a state of being contacted detachably attachable to the contact portion of the pedal arm and in which the rotation member adds reaction force in the direction to return the pedal arm to the rest position with drive force of the drive source. Here, first distance from a contact position of the rotation member with the contact portion to the first rotation axis line is formed longer than second distance from the contact position of the rotation member with the contact portion to the second rotation axis line, and the pedal arm includes a contact section formed so that the contact portion is displaced to be closer to the second rotation axis line while being contacted to the contact section when the pedal arm is rotated toward the maximum depression position and so that the contact portion is displaced to be farther from the second rotation axis line while being contacted to the contact section when the pedal arm is rotated toward the rest position.

According to an aspect, while the pedal arm is rotated between the rest position and the maximum depression position as an operator (i.e., a driver) operates the accelerator pedal, reaction force (i.e., resistance force or press-back force) may be generated in the direction to return the pedal arm to the rest position against tread force of the operator (i.e. the driver) as activating the reaction force adding mechanism under predetermined conditions. Meanwhile, when tread force is released, the pedal arm may be reliably returned to the rest position with urging force of the return spring.

Here, the reaction force adding mechanism may be configured to include the drive source and the rotation member being rotated in the same direction as the pedal arm in a state of being contacted detachably attachable to the contact portion of the pedal arm, and then, is configured that the rotation member adds reaction force in the direction to return the pedal arm to the rest position with drive force of the drive source. Accordingly, active control with quick response can be performed while achieving structural simplification, parts count reduction, cost reduction, entire apparatus miniaturization, and the like.

In particular, the first distance from the contact position of the rotation member with the contact portion of the pedal arm to the first rotation axis line of the pedal arm may be formed longer than the second distance from the contact position of the rotation member with the contact portion of the pedal arm to the second rotation axis line of the rotation member. In addition, the rotation member may include the contact section formed so that the contact portion is displaced to be closer to the second rotation axis line while being contacted to the contact section when the pedal arm is rotated toward the maximum depression position and so that the contact portions is displaced to be farther from the second rotation axis line while being contacted to the contact section when the pedal arm is rotated toward the rest position. Accordingly, the operational angle can be widened as shortening arm length of rotation torque exerted to the pedal arm by the rotation member. Therefore, stable drive force, that is, reaction force (i.e., resistance force) can be generated while achieving miniaturization of the drive source and the entire apparatus.

According to an aspect, it is possible to obtain the reaction force adding mechanism (i.e., the active control) capable of generating reaction force (i.e., resistance force or press-back force) opposing to tread force of the accelerator pedal for danger avoidance, danger notification, fuel consumption improvement or the like while achieving structural simplification, parts count reduction, cost reduction, entire apparatus miniaturization, and the like. Further, the accelerator pedal apparatus capable of performing the active control with quick response can be obtained.

BRIEF DESCRIPTION OF THE DRAWINGS

These and/or other aspects will become apparent and more readily appreciated from the following description of embodiments, taken in conjunction with the accompanying drawings of which.

DESCRIPTION OF EMBODIMENTS

Figure 1:
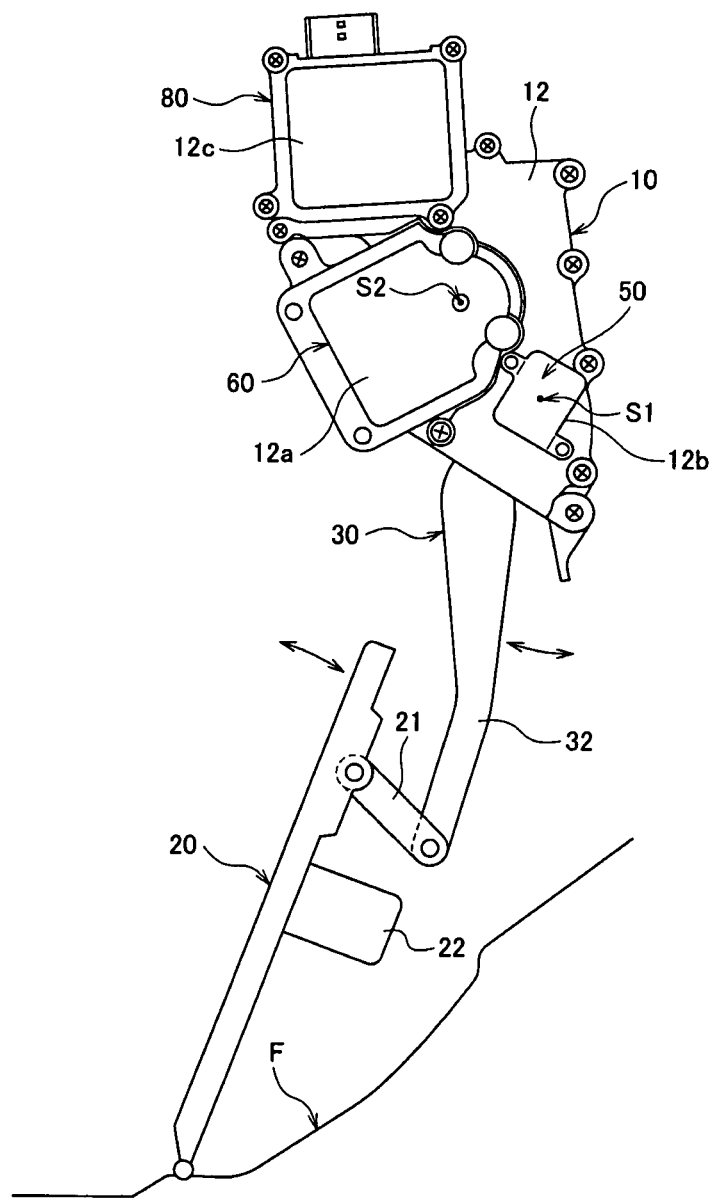
FIG. 1 is a side view which illustrates an accelerator pedal apparatus according to an embodiment.

Reference will now be made in detail to embodiments, examples of which are illustrated in the accompanying drawings, wherein like reference numerals refer to like elements throughout.

Figure 2:
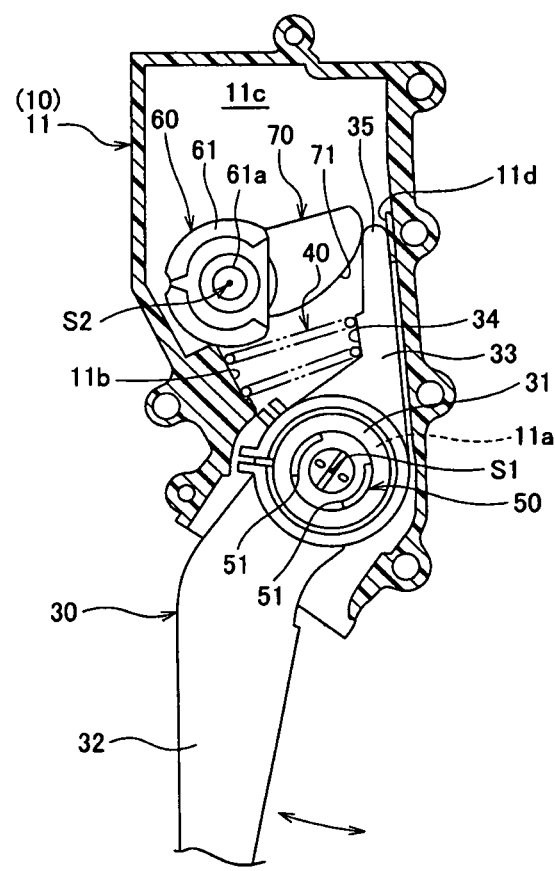
FIG. 2 is a side view which illustrates an inner structure of the accelerator pedal apparatus of FIG. 1.
Figure 3:
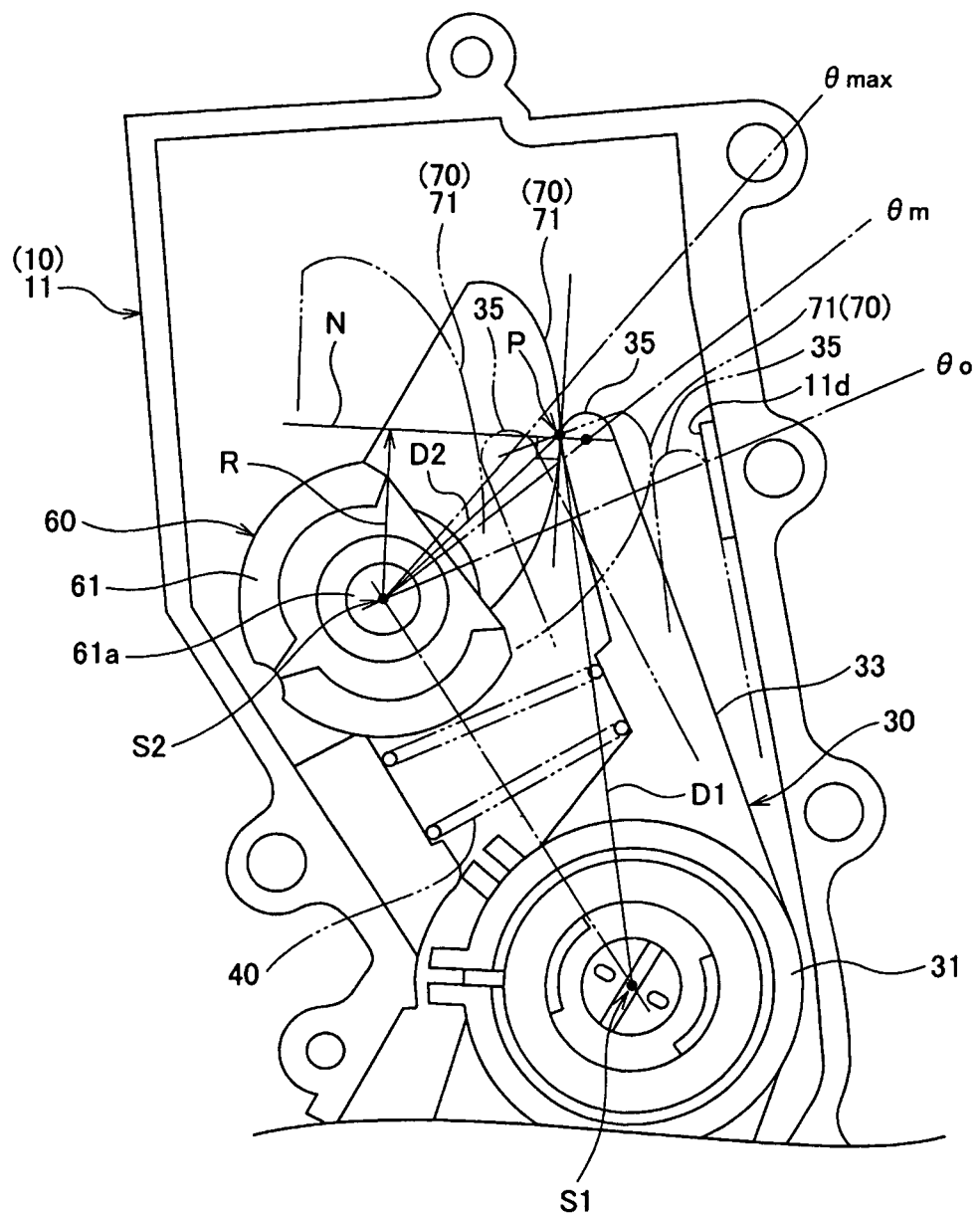
FIG. 3 is a partial side view showing operation of the accelerator pedal apparatus of FIG. 1.

As illustrated in FIGS. 1 to 3, the accelerator pedal apparatus includes a housing 10 fixed to a vehicle body of an automobile and the like, an accelerator pedal 20 supported swingably to a floor face F of the vehicle body, a pedal arm 30 supported rotatably having a predetermined first rotation axis line S1 defined by the housing 10 as the center between a rest position to a maximum depression position (i.e., a rotation range) while being interlocked with the accelerator pedal 20, a return spring 40 to exert urging force to return the pedal arm 30 toward the rest position, a position sensor 50 to detect a rotational angle position of the pedal arm 30, a drive source 60 and a means for rotation (i.e., a rotation member 70) being rotatable around a second rotation axis line S2 defined by a drive shaft 61a of the drive source 60 while having a contact section 71 to be contacted to the pedal arm 30 (i.e., a contact portion 35 thereof) as a means for adding reaction force, (i.e., a reaction force adding mechanism), to add reaction force in the direction to return the pedal arm to the rest position under predetermined conditions, a control unit 80 to perform drive control of the drive source 60, and the like.

The housing 10 is formed of resin material as a whole. As illustrated in FIGS. 1 and 2, the housing 10 is constituted with a housing main body 11 and a housing cover 12 which are mutually coupled with screws.

As illustrated in FIG. 2, the housing main body 11 includes a support shaft 11a to support the pedal arm 30 rotatably around the first rotation axis line S1, a receiving portion 11b to receive one end part of the return spring 40, a concave portion 11c to accommodate a part of the pedal arm 30 and the rotation member 70 and the drive source 60, a rest stopper 11d to stop the pedal arm 30 at the rest position, and the like.

As illustrated in FIG. 1, the housing cover 12 includes an accommodating portion 12a to accommodate the drive source 60, a sensor accommodating portion 12b to accommodate the position sensor 50, a cover portion 12c to cover the control unit 80, and the like.

As illustrated in FIG. 1, the accelerator pedal 20 is connected to the pedal arm 30 (i.e., a pedal side arm 32 thereof) via a link member 21 connected to the rear face of the upper section thereof having the lower end portion connected swingably to the floor face F. Further, the accelerator pedal 20 has a full-open stopper 22 to be contacted to the floor face F to define the maximum depressing position of the pedal arm 30.

The pedal arm 30 is formed of resin material as a whole. As illustrated in FIGS. 1 to 3, the pedal arm 30 includes a cylindrical portion 31 rotatably supported by the support shaft 11a of the housing 10 (defining the first rotation axis line S1), the pedal side arm 32 integrally formed as extending downward (i.e., to one side) from the cylindrical portion 31 (i.e., the first rotation axis line S1); a contact side arm 33 integrally formed as extending upward (i.e. to the other side) from the cylindrical portion 31 (i.e., the first rotation axis line S1), a receiving portion 34 to receive the other end part of the return spring 40 formed at the front face side of the contact side arm 33 as being closer to the cylindrical portion 31, the contact portion 35 formed at the upper end portion of the contact side arm 33 being curved to be arc-shaped so at to be contacted to the contact section 71 of the rotation member 70, and the like.

The pedal arm 30 is rotatable around the first rotation axis line S1 as the cylindrical portion 31 being fitted to the support shaft 11a of the housing 10. Further, the lower end portion of the pedal side arm 32 is connected to the link member 21, as illustrated in FIG. 1.

Further, as illustrated in FIGS. 2 and 3, the pedal arm 30 is rotatable in a rotation range between the rest position where the vicinity of the upper end portion (i.e., the contact portion 35) thereof contacts to the rest stopper 11d and the maximum depression position where the full-open stopper 22 contacts to the floor face F.

The return spring 40 is a compression type coil spring formed of spring steel and the like. As illustrated in FIGS. 2 and 3, the return spring 40 is arranged in a state of being compressed to have a predetermined compression amount as the one end part thereof being engaged with the receiving portion 11b of the housing 10 and the other end part thereof being directly engaged with the receiving portion 34 of the pedal arm 30. Accordingly, the return spring 40 directly exerts urging force to the pedal arm 30 to return toward the rest position.

Therefore, even in the case that the reaction force adding mechanism (i.e., the drive source 60 and the rotation member 70) becomes non-movable as being fixed at some midpoint, the pedal arm 30 can be reliably returned to the rest position by the urging force of the return spring 40 when tread force is released.

As illustrated in FIGS. 1 and 2, the position sensor 50 is arranged in the cylindrical portion 31 of the pedal arm 30 and the sensor accommodating portion 12b of the housing cover 12 at the area around the first rotation axis line S1.

The position sensor 50 is a non-contact type magnetic sensor, for example, and is provided with a circular armature (not illustrated) made of magnetic material arranged at the area of the cylindrical portion 31 of the pedal arm 30, a pair of arc-shaped permanent magnets 51 connected to an inner circumferential face of the armature, two stators (not illustrated) made of magnetic material embedded in the housing cover 12, two hall elements (not illustrated) arranged between the two stators, and the like. A circuit board having terminals and various electronic parts mounted is provided as a part relating thereto.

Then, when the pedal arm 30 is rotated, the position sensor 50 detects variation of magnetic flux density with the hall elements and outputs as a voltage signal. In this manner, the angular position of the pedal arm 30 is detected.

As illustrated in FIGS. 2 and 3, the drive source 60 is a torque motor including a rotor 61 having the drive shaft 61a defining the second rotation axis line S2 (i.e., the drive shaft 61a being coaxial to the second rotation axis line S2) at the vicinity of the contact side arm 33 of the pedal arm 30 in the upper area from the first rotation axis line S1 of the pedal arm 30. Further, the drive source 60 is provided with an angle sensor (not illustrated) to detect the rotation angle of the rotor 61 (i.e., the rotation member 70).

The rotor 61 of the drive source 60 is configured to be rotated in an angular range (i.e., the operational angle) between a rest angle $\theta_0$ corresponding to when the pedal arm 30 is located at the rest position and a maximum rotation angle $\theta_{max}$ corresponding to when the pedal arm 30 is located at the maximum depression position via an intermediate angle $\theta_m$ corresponding to when the pedal arm 30 is located at an intermediate depression position.

The rotor 61 integrally rotates the rotation member 70 as directly connecting one end part of the rotation member 70 to the drive shaft 61a.

Figure 5:
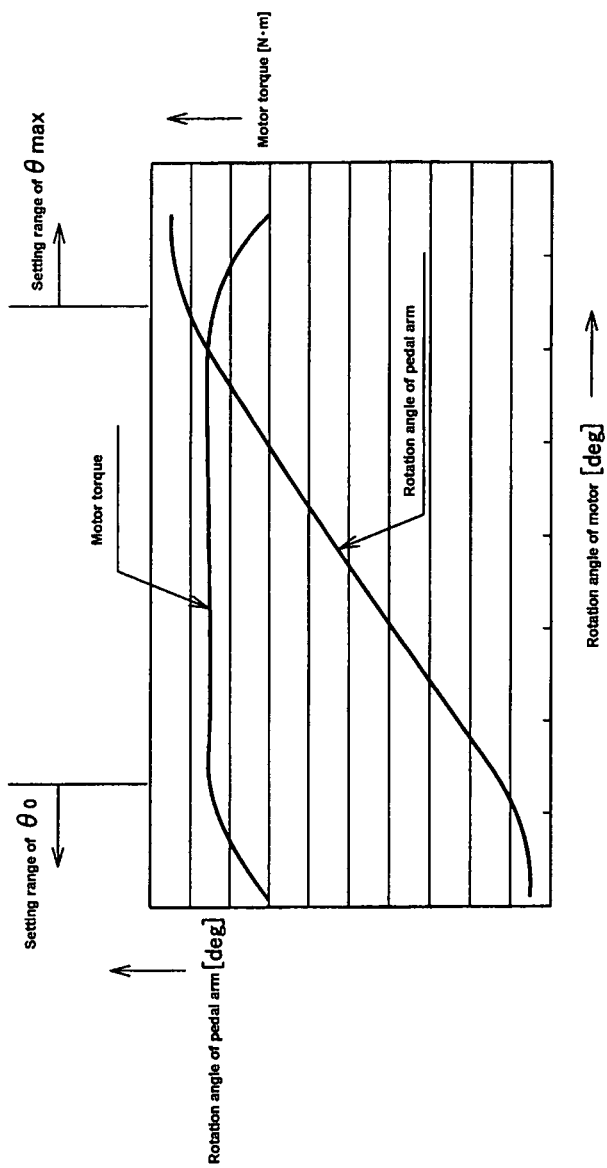
FIG. 5 is a graph which indicates a relationship of rotational drive force (i.e., motor torque) and a rotational angle of a pedal arm against a rotational angle of a drive source (i.e., a torque motor) included in the accelerator pedal apparatus of FIG. 1.

Here, as illustrated in FIG. 5, the characteristics of the rotational drive force (i.e., the motor torque) of the drive source 60 (i.e., the torque motor) against the rotation angle indicate that values in a range of the small motor rotation angle corresponding to the rest angle $\theta_0$ and in a range of the large motor rotation angle corresponding to the maximum rotation angle $\theta_{max}$ are smaller than a value in an intermediate rotation range of the motor rotation angle corresponding to the intermediate angle $\theta_m$.

As illustrated in FIGS. 2 and 3, the rotation member 70 is formed to define a circumferential cam by utilizing a plate-shaped metallic member and the like. The rotation member 70 is directly connected to the drive shaft 61a of the drive source 60 at one end part thereof and defines the contact section 71 contacted to the contact portion 35 of the pedal arm 30 being detachably attachable at the circumference thereof.

As illustrated in FIG. 3, the contact section 71 is formed to define a cam profile so that the contact portion 35 of the pedal arm 30 is displaced to be closer to the second rotation axis line S2 while being contacted to the contact section 71 when the pedal arm 30 is rotated toward the maximum depression position and so that the contact portion 35 of the pedal arm 30 is displaced to be farther from the second rotation axis line S2 while being contacted to the contact section 71 when the pedal arm 30 is rotated toward the rest position.

The rotation member 70 is rotatable around the second rotation axis line S2 (i.e., the drive shaft 61a) so as to be rotated in the same direction as the pedal arm 30 in a state that the contact section 71 is contacted to the contact portion 35 of the pedal arm 30.

When the drive source 60 does not exert rotational drive force (i.e., rotational torque), the rotation member (i.e., the rotation lever) 70 is rotated to follow the rotation of the pedal arm 30, that is, to follow freely without exerting resistance force against movement of the contact side arm 33 in a state that the contact section 71 is contacted to the contact portion 35. Meanwhile, when the drive source 60 exerts rotational drive force (i.e., rotational torque), the rotation member 70 exerts reaction force (i.e., resistance force or press-back force) in the direction to return the pedal arm 30 to the rest position against the tread force.

In this manner, since the rotation member 70 exerts reaction force (i.e., resistance force or press-back force) as rotating in the same direction as the rotation direction of the pedal arm 30 toward the rest position, the first rotation axis line S1 of the pedal arm 30 and the second rotation axis line S2 of the rotation member 70 can be arranged to be mutually closed. Accordingly, aggregation of the structure and miniaturization of the apparatus can be achieved.

Here, when a roller rolling as being contacted to the contact section 71 is adopted as the contact potion 35, the contact portion 35 of the pedal arm 30 is contacted to the contact section 71 of the rotation member 70 via the roller. Accordingly, friction and resistance at the contact boundary face can be suppressed and energy loss can be reduced, so that active control can be performed effectively and smoothly.

Furthermore, as described above, the drive source 60 is a torque motor having the drive shaft 61a being integrally rotated coaxially to the second rotation axis line S2. The torque motor being the drive source 60 is a direct-drive type to directly rotate the rotation member 70. Accordingly, structural simplification can be achieved due to reduction of a parts count and the rotational drive force of the torque motor (i.e., the drive source 60) can be effectively converted into the rotation torque of the rotation member 70 with little loss.

Here, description will be provided on the arrangement relation among the first rotation axis line S1 of the pedal arm 30, the second rotation axis line S2 of the rotation member 70, the contact section 71, and the contact portion 35.

First, as illustrated in FIG. 3, first distance D1 from a position P at which the contact portion 35 is contacted to the rotation member 70 (i.e., the contact section 71 thereof) to the first rotation axis line S1 is formed (i.e., arranged) to be longer than second distance D2 from the position P at which the contact portion 35 is contacted to the rotation member 70 (i.e., the contact section 71 thereof) to the second rotation axis line S2.

Further, as illustrated in FIG. 3, it is configured that the contact portion 35 is displaced to be closer to the second rotation axis line S2 while maintaining the contact when the pedal arm 30 is rotated toward the maximum depression position (from the rest position) and that the contact portion 35 is displaced to be farther from the second rotation axis line S2 while maintaining the contact when the pedal arm 30 is rotated toward the rest position (from the maximum depression position). That is, the contact section 71 of the rotation member 70 is formed to have a cam profile shape to cause the abovementioned displacement of the contact portion 35.

According to the above configuration, the operational angle can be widened as shortening arm length of rotation torque exerted to the pedal arm 30 by the rotation member 70. Therefore, stable drive force, that is, reaction force (i.e., resistance force or press-back force) can be generated while achieving miniaturization of the drive source and the entire apparatus.

Further, as illustrated in FIGS. 3, 4A, 4B and 4C, the contact section 71 of the rotation member 70 is formed so that arm length R from the second rotation axis line S2 to a normal line N at the position P to which the contact portion 35 contacts varies in a rotation range between the rest position and the maximum depression position.

With this configuration, the arm length R of rotation torque exerted to the pedal arm 30 by the rotation member 70 varies corresponding to the rotation range of the pedal arm 30. In the case that drive force of the drive source 60 varies in the rotation range, the arm length R is shortened in a range where drive force of the drive source 60 is small and the arm length R is prolonged in a range where drive force of the drive source 60 is large, for example. Accordingly, reliable active control having quick response can be performed without a fear that the rotation member 70 becomes difficult to be operated due to excessive load.

Figures 4A, 4B, 4C:
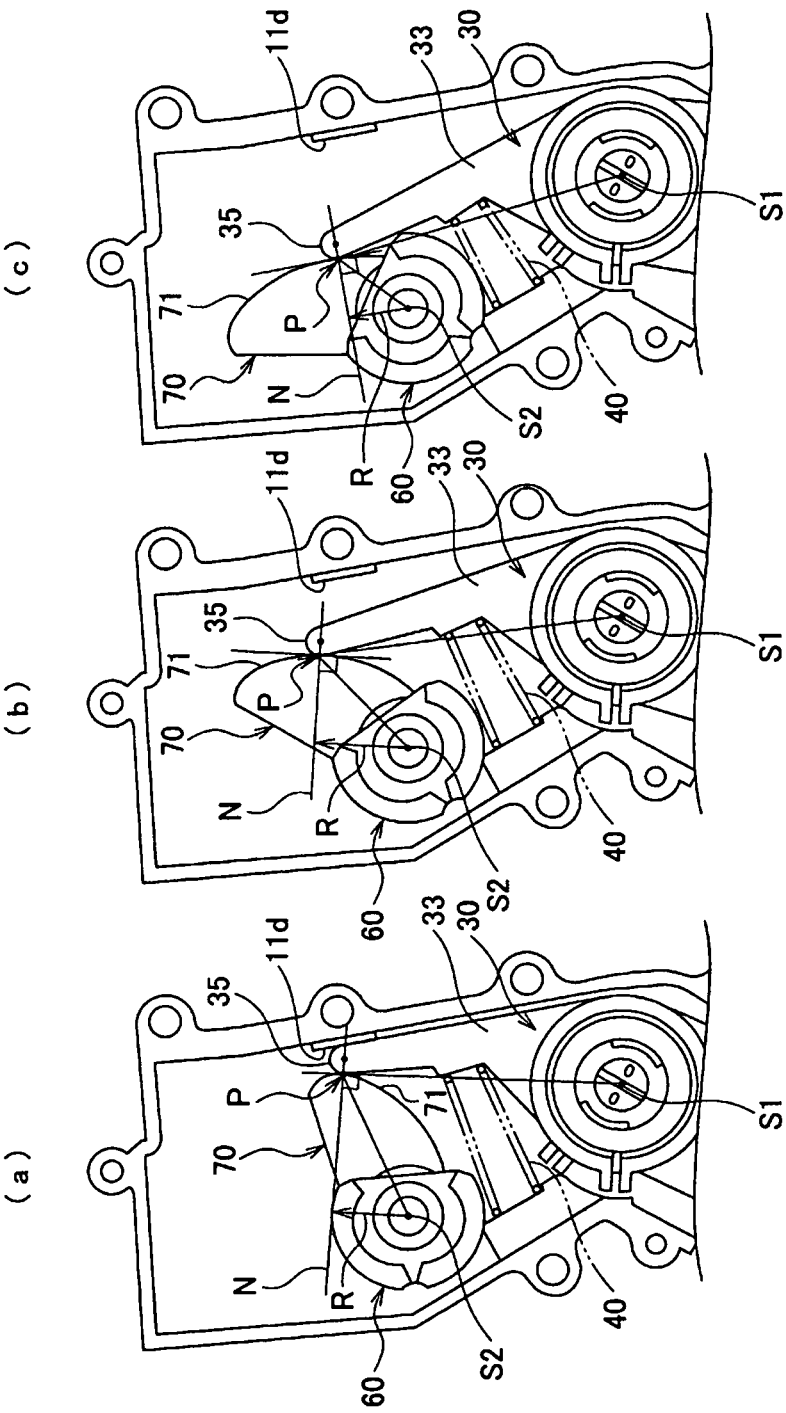
FIGS. 4A to 4C are operational views showing operation of the accelerator pedal apparatus of FIG. 1.

Here, since the drive source 60 is a torque motor indicating rotational torque characteristics as illustrated in FIG. 5, the contact section 71 of the rotation member 70 is formed so that the arm length R at the vicinities of both ends of the rotation range as illustrated in FIGS. 4A and 4C (i.e., the vicinity of the rest position and the vicinity of the maximum depression position) is shorter than the arm length R at the vicinity of a midpoint of the rotation range as illustrated in FIG. 4B.

With this configuration, in the case that drive force of the drive source is small in an operation area corresponding to vicinities of both ends of a rotation range between the rest position and the maximum depression position and is large in an operation area corresponding to an intermediate area of the rotation range, the rotation member can be smoothly rotated without causing excessive load in the operation area corresponding to the vicinities of the both ends and large reaction force or press-back force can be obtained in accordance with the drive force in the operation area corresponding to the intermediate area.

The control unit 80 is to control driving of the drive source 60 of the reaction force adding mechanism. As illustrated in FIG. 1, the control unit 80 is attached to the inside of a cover portion 12c of the housing cover 12.

By integrating the control unit 80 with the housing 10 as mentioned above, wiring and the like are shortened and reliability is enhanced. Further, the accelerator pedal apparatus having a mechanism (i.e., the reaction force adding mechanism) capable of performing active control can be easily mounted without accompanying major modification at the vehicle side.

With the accelerator pedal apparatus having the above configuration, while the pedal arm is rotated between the rest position and the maximum depression position as an operator (i.e., a driver) operates the accelerator pedal, reaction force (i.e., resistance force or press-back force) can be generated in the direction to return the pedal arm to the rest position against tread force of the operator (i.e. the driver) as activating the reaction force adding mechanism under predetermined conditions (for example, in a case that danger avoidance or danger notification is required during vehicle driving or a case that fuel consumption is to be improved by suppressing excessive depression). Meanwhile, when tread force is released, the pedal arm is reliably returned to the rest position with urging force of the return spring.

Specifically, the reaction force adding mechanism includes the drive source 60 and the rotation member 70 being rotated in the same direction as the pedal arm 30 in a state of being contacted detachably attachable to the contact portion 35 of the pedal arm 30, and then, the rotation member 70 is formed to add reaction force in the direction to return the pedal arm 30 to the rest position with drive force of the drive source 60. Accordingly, reaction force (i.e., resistance force or press-back force) opposed to tread force of the accelerator pedal 30 can be generated quickly and stably for danger avoidance, danger notification, fuel consumption improvement or the like while achieving structural simplification, parts count reduction, cost reduction, entire apparatus miniaturization, and the like. In this manner, active control having quick response can be performed.

Next, operation of the accelerator pedal apparatus will be described.

First, in a state of being at the rest position without depression of the accelerator pedal 20 by an operator (i.e., a driver), the pedal arm 30 is stopped at the rest position as illustrated in FIGS. 2 and 4A as the contact side arm 33 (i.e., the vicinity of the upper end portion thereof) of the pedal arm 30 being contacted to the rest stopper 11d with urging force of the return spring 40.

At that time, the contact section 71 of the rotation member 70 is kept contacted to the contact section 35 in a state of not exerting reaction force to the pedal arm 30.

When the operator (i.e., the driver) depresses the accelerator pedal 20 from the above state, the pedal arm 30 is rotated counterclockwise in FIGS. 2, 4A, 4B and 4C against urging force of the return spring 40. The pedal arm 30 is rotated to the maximum depression position (i.e., the full-open position) via an intermediate depression position and is stopped as the full-open stopper 22 of the accelerator pedal 20 is contacted to the floor face F. During the depressing operation, the rotation member 70 follows movement of the pedal arm 30 without exerting any load (i.e., resistance force or press-back force).

Meanwhile, when the operator (i.e., the driver) releases tread force, the pedal arm 30 is moved toward the rest position due to urging force of the return spring 40 and is stopped as the contact side arm 33 being contacted to the rest stopper 11d of the housing 10 (i.e., the housing main body 11). During the returning operation, the rotation member 70 follows movement of the pedal arm 30 without exerting any load (i.e., resistance force or press-back force).

Here, in a state that the accelerator pedal 20 is depressed by the operator (i.e., the driver), it is assumed, for example, that press-back for danger avoidance or danger notification or suppression of depressing for fuel consumption improvement is determined to be required, that is, it is assumed being under predetermined conditions. In this case, the drive source 60 of the reaction force adding mechanism is activated and drive control is performed to generate rotational torque clockwise in FIGS. 4A, 4B and 4C at the rotation member 70 and to exert reaction force (i.e., resistance force or press-back force) in the direction to return the pedal arm 30 to the rest position against tread force of the operator (i.e., the driver) based on a control signal from the control unit 80, an output signal from the angle sensor of the drive source 60, and the like. Here, the determination is to be performed by a separate inter-vehicular distance detection system and the like.

In this manner, the responsibility can be enhanced when the active control is required for danger avoidance, danger notification or fuel consumption improvement.

Further, the contact section 71 of the rotation member 70 is detachably attachable to the contact portion 35 of the pedal arm 30 and the return spring 40 exerts urging force directly to the pedal arm 30. Accordingly, even in a case that operational malfunction occurs with the reaction force adding mechanism (i.e. the drive source 60 and the rotational member 70), the pedal arm 30 can be reliably ensured to return toward the safety side (i.e., the rest position).

The above embodiment is applied in a case where only the active control mechanism (i.e., the reaction force adding mechanism) is adopted. However, the embodiment is not limited to this, and the embodiment may be adopted to a configuration to include a hysteresis generating mechanism to generate hysteresis on the tread force.

In the description of the above embodiment, the pedal arm 30 integrally includes the pedal side arm 32 at the lower side and the contact side arm 33 at the upper side as the first rotation axis line S1 being the center. However, the present invention is not limited to this. For example, the present invention may be adopted to a pedal arm having a pedal side arm and a contact side arm extended to be L-shaped.

In the description of the above embodiment, the rotation member 70 constituting the reaction force adding mechanism is shaped to be half-round. However, the rotation member 70 is not limited to this shape, and other shapes may be adopted as long as having a contact section contacted in a detachably attachable manner to the contact portion 35 of the pedal arm 30 and being rotated around the second rotation axis line S2.

In the description of the above embodiment, the contact portion 35 of the pedal arm 30 is integrally formed as the free end of the contact side arm 33. However, the contact portion is not limited to the above, it is also possible that a rolling roller is arranged at the free end as the contact portion.

In the description of the above embodiment, the rotation member 70 is directly coupled to the drive shaft 61a as the drive source 60 constituting the reaction force adding mechanism. However, other types may be adopted as long as rotational drive force can be exerted to the rotation member 70.

In the description of the above embodiment, the pedal arm 30 is connected to the accelerator pedal 20 via the link member 21 as the pedal arm 30 interlocked with the accelerator pedal 20. However, the pedal arm 30 is not limited to this, and the embodiments of the present invention may be adopted to a configuration that the accelerator pedal is integrally arranged with the pedal arm.

In the description of the above embodiment, a compression type coil spring is adopted as the return spring 40 urging the pedal arm 30 toward the rest position. However, a torsion type spring may be adopted to be arranged around the first rotation axis line S1.

In the description of the above embodiment, the control unit 80 is attached integrally to the housing 10. However, the control unit 80 may be separated from the housing as a separate unit.

As described above, with an accelerator pedal apparatus according to embodiments of the present invention, the active control (i.e., the reaction force adding mechanism) capable of generating reaction force or press-back force opposing to tread force of the accelerator pedal can surely function for danger avoidance, danger notification, fuel consumption improvement or the like while achieving structural simplification, parts count reduction, cost reduction, entire apparatus miniaturization, and the like. Further, the accelerator pedal apparatus capable of performing the active control with quick response can be obtained. Therefore, in addition to natural adoptability to various types of automobiles, the embodiments are advantageous for other vehicles and the like.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An accelerator pedal apparatus comprising:
a pedal arm being interlocked with an accelerator pedal and having a contact portion;
a housing to rotatably support the pedal arm between a rest position and a maximum depression position around a first rotation axis line;
a return spring to return the pedal arm toward the rest position; and
a means for adding reaction force which includes a drive source having a drive shaft arranged at the housing and a means for rotation being rotated around a second rotation axis line in the same direction as the pedal arm in a state of being contacted detachably to the contact portion of the pedal arm and in which the means for rotation adds reaction force in the direction to return the pedal arm to the rest position with rotational drive force of the drive source by rotating the drive shaft of the drive source,
a first distance from a contact position of the means for rotation with the contact portion to the first rotation axis line being formed longer than a second distance from the contact position of the means for rotation with the contact portion to the second rotation axis line,
the means for rotation is directly connected to the drive shaft integrally rotated coaxially to the second rotation axis line, and is formed to define a contact section contacted detachably to the contact portion of the pedal arm in the circumference of the means for rotation,
the contact section includes a cam profile shape which causes displacement so that the contact portion is displaced to be closer to the second rotation axis line while being contacted to the contact section at the circumference of the means for rotation when the pedal arm is rotated toward the maximum depression position and so that the contact portion is displaced to be farther from the second rotation axis line while being contacted to the contact section when the pedal arm is rotated toward the rest position at the circumference of the means for rotation, wherein the contact section of the means for rotation is formed so that arm length from the second rotation axis line to a normal line at a position to which the contact portion contacts varies in a rotation range between the rest position and the maximum depression position.

2. The accelerator pedal apparatus according to claim 1, wherein the contact section of means for rotation is formed so that the arm length at both ends of the rotation range is shorter than the arm length at a midpoint of the rotation range.

3. The accelerator pedal apparatus according to claim 1, wherein the pedal arm includes a pedal side arm which is interlocked with the accelerator pedal and a contact side arm which has the contact portion, the pedal side arm extending to one side and the contact side arm extending to the other side as sandwiching the first rotation axis line, and the second rotation axis line is arranged to be closer to the contact side arm.

4. The accelerator pedal apparatus according to claim 1, wherein the pedal arm includes a pedal side arm which is interlocked with the accelerator pedal and a contact side arm which has the contact portion, the pedal side arm extending to one side and the contact side arm extending to the other side as sandwiching the first rotation axis line, and the second rotation axis line is arranged to be closer to the contact side arm.

5. The accelerator pedal apparatus according to claim 2, wherein the pedal arm includes a pedal side arm which is interlocked with the accelerator pedal and a contact side arm which has the contact portion, the pedal side arm extending to one side and the contact side arm extending to the other side as sandwiching the first rotation axis line, and the second rotation axis line is arranged to be closer to the contact side arm.

6. The accelerator pedal apparatus according to claim 1, wherein the drive source is a torque motor having the drive shaft integrally rotated coaxially to the second rotation axis line.

7. The accelerator pedal apparatus according to claim 1, wherein the drive source is a torque motor having the drive shaft integrally rotated coaxially to the second rotation axis line.

8. The accelerator pedal apparatus according to claim 2, wherein the drive source is a torque motor having the drive shaft integrally rotated coaxially to the second rotation axis line.

9. The accelerator pedal apparatus according to claim 3, wherein the drive source is a torque motor having the drive shaft integrally rotated coaxially to the second rotation axis line.

10. The accelerator pedal apparatus according to claim 4, wherein the drive source is a torque motor having the drive shaft integrally rotated coaxially to the second rotation axis line.

11. The accelerator pedal apparatus according to claim 5, wherein the drive source is a torque motor having the drive shaft integrally rotated coaxially to the second rotation axis line.

* * * * *